United States Patent
Yoshitomi

(10) Patent No.: US 9,692,028 B2
(45) Date of Patent: Jun. 27, 2017

(54) SEPARATOR FOR NONAQUEOUS ELECTROLYTE BATTERY, AND NONAQUEOUS ELECTROLYTE BATTERY

(71) Applicant: TEIJIN LIMITED, Osaka-shi, Osaka (JP)

(72) Inventor: Takashi Yoshitomi, Yamaguchi (JP)

(73) Assignee: TEIJIN LIMITED, Osaka (JP)

(*) Notice: Subject to any disclaimer, the term of this patent is extended or adjusted under 35 U.S.C. 154(b) by 172 days.

(21) Appl. No.: 14/413,526

(22) PCT Filed: Jul. 30, 2013

(86) PCT No.: PCT/JP2013/070540
§ 371 (c)(1),
(2) Date: Jan. 8, 2015

(87) PCT Pub. No.: WO2014/021292
PCT Pub. Date: Feb. 6, 2014

(65) Prior Publication Data
US 2015/0200388 A1    Jul. 16, 2015

(30) Foreign Application Priority Data
Jul. 30, 2012 (JP) ................................. 2012-168985

(51) Int. Cl.
*H01M 2/16* (2006.01)
*H01M 10/052* (2010.01)

(52) U.S. Cl.
CPC ....... *H01M 2/1686* (2013.01); *H01M 2/1653* (2013.01); *H01M 10/052* (2013.01)

(58) Field of Classification Search
CPC .......... B32B 2255/26; B32B 2307/306; B32B 2307/54; B32B 2307/718; B32B 2457/10; B32B 27/20; B32B 27/304; B32B 27/32; B32B 7/12; H01M 10/052; H01M 10/0525; H01M 2220/20; H01M 2220/30; H01M 2/14; H01M 2/145; H01M 2/1653; H01M 2/168; H01M 2/1686
See application file for complete search history.

(56) References Cited

U.S. PATENT DOCUMENTS

| | | | |
|---|---|---|---|
| 2002/0110732 A1* | 8/2002 | Coustier | H01M 2/1653 429/144 |
| 2007/0269714 A1* | 11/2007 | Watanabe | H01M 10/0436 429/120 |
| 2011/0143185 A1 | 6/2011 | Nishikawa | |
| 2011/0293976 A1 | 12/2011 | Chiba et al. | |

FOREIGN PATENT DOCUMENTS

| | | |
|---|---|---|
| JP | 2000-100408 A | 4/2000 |
| JP | 2002-015773 A | 1/2002 |
| JP | 2002-240215 A | 8/2002 |
| JP | 2003-103626 A | 4/2003 |
| JP | 2003-163033 A | 6/2003 |
| JP | 2004-241172 A | 8/2004 |
| JP | 2008-098154 A | 4/2008 |
| JP | 4127989 B2 | 7/2008 |
| JP | 2009-283273 A | 12/2009 |
| JP | 2011-138761 A | 7/2011 |
| JP | 2011-192528 A | 9/2011 |
| JP | 2012-011751 A | 1/2012 |
| JP | 2012-48918 A | 3/2012 |
| JP | 2012-119225 A | 6/2012 |
| JP | 2012-221741 A | 11/2012 |
| WO | 2010021248 A1 | 2/2010 |
| WO | 2012/011944 A2 | 1/2012 |

OTHER PUBLICATIONS

International Search Report of PCT/JP2013/070540 dated Sep. 17, 2013 [PCT/ISA/210].

* cited by examiner

*Primary Examiner* — Carlos Barcena
(74) *Attorney, Agent, or Firm* — Sughrue Mion, PLLC

(57) ABSTRACT

Provided is a separator for a nonaqueous electrolyte battery including a composite membrane. The composite membrane includes a porous substrate that contains a thermoplastic resin and an adhesive porous layer that is provided on at least one side of the porous substrate and contains an adhesive resin. The difference between the Gurley number of the porous substrate and the Gurley number of the composite membrane is 75 sec/100 cc or less. The difference between the tortuosity of the porous substrate and the tortuosity of the composite membrane is 0.30 or less.

7 Claims, No Drawings

SEPARATOR FOR NONAQUEOUS ELECTROLYTE BATTERY, AND NONAQUEOUS ELECTROLYTE BATTERY

CROSS REFERENCE TO RELATED APPLICATIONS

This application is a National Stage of International Application No. PCT/JP2013/070540, filed Jul. 30, 2013 (claiming priority based on Japanese Patent Application No. 2012-168985, filed Jul. 30, 2012), the contents of which are incorporated herein by reference in their entirety.

TECHNICAL FIELD

The present invention relates to a separator for a nonaqueous electrolyte battery and also to a nonaqueous electrolyte battery.

BACKGROUND ART

Nonaqueous electrolyte batteries, such as lithium ion secondary batteries, have been widely used as power sources for portable electronic devices such as laptop computers, mobile phones, digital cameras, and camcorders. Further, these batteries are characterized by having high energy density, and thus their application to automobiles and the like has also been studied in recent years.

With the reduction in size and weight of portable electronic devices, the outer casing of a nonaqueous electrolyte battery has been simplified. As outer casings, battery cans made of stainless steel were originally used, and then outer casings formed of aluminum cans have been developed. Further, soft pack outer casings formed of aluminum laminate packs have also been developed nowadays. In the case of a soft pack outer casing formed from an aluminum laminate, because the outer casing is soft, a space may be formed between an electrode and a separator during charging and discharging, causing the technical problem of reduced cycle life. In terms of solving this problem, a technique for bonding an electrode and a separator together is important, and a large number of technical proposals have been made.

As one of the proposals, a technique of using a separator including a polyolefin microporous membrane, which is a conventional separator, and a porous layer made of a polyvinylidene fluoride resin (hereinafter sometimes referred to as adhesive porous layer) formed thereon is known (see, e.g., Patent Document 1). When such an adhesive porous layer with an electrolyte contained therein is placed on an electrode and hot-pressed, the electrode and the separator can be well joined together, where the adhesive porous layer can function as an adhesive. Thus, the cycle life of a soft pack battery can be improved.

In addition, in the case where a battery is produced using a conventional metal can outer casing, electrodes and a separator are placed on top of one another and wound to produce a battery element, and the element is enclosed in a metal can outer casing together with an electrolyte, thereby producing a battery. Meanwhile, in the case where a soft pack battery is produced using a separator like the separator of Patent Document 1 mentioned above, a battery element is produced in the same manner as for the battery having a metal can outer casing mentioned above, then enclosed in a soft pack outer casing together with an electrolyte, and finally subjected to a hot-pressing process, thereby producing a battery. Thus, in the case where a separator including an adhesive porous layer as mentioned above is used, it is possible to produce a battery element in the same manner as for the battery having a metal can outer casing mentioned above. This is advantageous in that there is no need to greatly change the production process for conventional batteries having a metal can outer casing.

Against this background, various technical proposals have been made in the past for separators made of a polyolefin microporous membrane and an adhesive porous layer laminated thereon. For example, in terms of achieving both the ensuring of sufficient adhesion and ion permeability, Patent Document 1 presents a new technical proposal focusing on the porous structure and thickness of a polyvinylidene fluoride resin layer.

PRIOR ART DOCUMENTS

Patent Documents

Patent Document 1: Japanese Patent No. 4127989

SUMMARY OF THE INVENTION

Problems that the Invention is to Solve

However, in Patent Document 1, a shutdown function of the separator is not considered. A shutdown function herein refers to the following function: upon an increase in battery temperature, a thermoplastic resin melts and closes pores of a porous substrate, thereby blocking the movement of ions to prevent the battery from thermal runaway. In the case where an adhesive porous layer is formed on the surface of a polyolefin microporous membrane, at the time when the shutdown function is developed, the adhesive porous layer may prevent to close pores on the surface of the polyolefin microporous membrane, inhibiting the shutdown function.

Against this background, an object of the invention is to provide a separator for a nonaqueous electrolyte battery having excellent adhesion to electrodes, ion permeability, and shutdown characteristics. The invention addresses the achievement of the above object.

Means for Solving the Problems

In order to solve the problems mentioned above, the invention is configured as follows.

<1> A separator for a nonaqueous electrolyte battery including a composite membrane including:
  a porous substrate that contains a thermoplastic resin; and
  an adhesive porous layer that is provided on at least one side of the porous substrate and contains an adhesive resin,
  the difference between the Gurley number of the porous substrate and the Gurley number of the composite membrane being 75 sec/100 cc or less,
  the difference between the tortuosity of the porous substrate and the tortuosity of the composite membrane being 0.30 or less.

<2> The separator for a nonaqueous electrolyte battery according to <1>, wherein the ratio of the standard deviation of the Gurley number of the composite membrane to the mean of the Gurley number of the composite membrane is 0.3 or less.

<3> The separator for a nonaqueous electrolyte battery according to <1> or <2>, wherein the Gurley number of the porous substrate is 50 sec/100 cc or more and 800 sec/100 cc or less.

<4> The separator for a nonaqueous electrolyte battery according to any one of <1> to <3>, wherein the tortuosity of the composite membrane is 1.5 to 2.5.

<5> The separator for a nonaqueous electrolyte battery according to any one of <1> to <4>, wherein the adhesive porous layer has an average pore size of 1 nm or more and 100 nm or less.

<6> The separator for a nonaqueous electrolyte battery according to any one of <1> to <5>, wherein the adhesive resin is a polyvinylidene fluoride resin.

<7> The separator for a nonaqueous electrolyte battery according to <6>, wherein the polyvinylidene fluoride resin has a weight average molecular weight of 500,000 or more and 3,000,000 or less.

<8> A nonaqueous electrolyte battery including:
  a positive electrode;
  a negative electrode; and
  the separator for a nonaqueous electrolyte battery of any one of <1> to <7> disposed between the positive electrode and the negative electrode,
  an electromotive force thereof being obtained by lithium doping/dedoping.

Advantage of the Invention

According to the invention, a separator for a nonaqueous electrolyte battery having excellent adhesion to electrodes, ion permeability, and shutdown characteristics can be provided.

In addition, a nonaqueous electrolyte battery having superior ion permeability and shutdown characteristics as compared with the prior art can be provided.

MODE FOR CARRYING OUT THE INVENTION

Hereinafter, the separator for a nonaqueous electrolyte battery of the invention and a nonaqueous electrolyte battery using the same will be described in detail. Incidentally, in numerical ranges given below, "to" means that the numerical range includes the minimum and the maximum.
<Separator for Nonaqueous Electrolyte Battery>

The separator for a nonaqueous electrolyte battery of the invention (hereinafter sometimes simply referred to as "separator") includes a composite membrane including a porous substrate, which contains a thermoplastic resin, and an adhesive porous layer, which is provided on at least one side of the porous substrate and contains an adhesive resin. Further, in the separator (composite membrane) of the invention, the difference (Gurley difference) $\Delta G$ between the Gurley number $G_B$ of the porous substrate and the Gurley number $G_S$ of the composite membrane is 75 sec/100 cc or less, and the difference (tortuosity difference) $\Delta \tau$ between the tortuosity $\tau_B$ of the porous substrate and the tortuosity $\tau_S$ of the composite membrane is 0.30 or less.

A separator for a nonaqueous electrolyte battery configured as above has excellent adhesion to electrodes, ion permeability, and shutdown characteristics. Therefore, the use of such a separator makes it possible to provide a high-performance nonaqueous electrolyte battery having an aluminum laminate pack outer casing, which has excellent rate characteristics, cycle characteristics, and like battery characteristics and is highly safe at high temperatures.

A separator is present between a positive electrode and a negative electrode in a nonaqueous electrolyte battery (hereinafter sometimes simply referred to as "battery") and serves to prevent the electrodes from shorting and allow for the smooth permeation of ions in the electrolyte, such as lithium ions. At this time, in order to suppress a decrease in battery life, ions are required to permeate uniformly over the entire separator without being concentrated on a part of the separator.

In the invention, the separator has a laminated structure including a porous substrate and an adhesive porous layer. Therefore, when the pore openings of the porous substrate are covered with the adhesive porous layer, or the pore openings of the adhesive porous layer are closed with the porous substrate, ion permeability is impaired. Therefore, in order to enhance the ion permeability of the separator, it is preferable that the pores of the porous substrate and the pores of the adhesive porous layer communicate with each other.

Here, it is believed that when the separator is configured to have a Gurley difference $\Delta G$ ($=|G_B-G_S|$) of 75 sec/100 cc or less and a tortuosity difference $\Delta \tau$ ($=|\tau_B-\tau_S|$) of 0.30 or less, the pore openings of the porous substrate and the adhesive porous layer are less likely to be closed with each other. That is, it is believed that in the laminated structure including an adhesive porous layer laminated on one or both sides of a porous substrate, the pores of the porous substrate and the pores of the adhesive porous layer are more likely to communicate with each other and pass through the separator. This is believed to result in the improvement of the ion permeability of the separator. In addition, because the pore openings of the porous substrate are less likely to be closed, when a battery is overheated, the pores of the porous substrate are more easily crushed, whereby the permeation of ions can be quickly blocked. Thus, shutdown characteristics are also excellent.

Further, because the adhesive porous layer contains an adhesive resin, adhesion between the separator and electrodes is also excellent.

The Gurley difference $\Delta G$ and tortuosity difference $\Delta \tau$ mentioned above can be controlled, for example, by the selection of a porous substrate having a specific Gurley number and specific tortuosity or by the adjustment of the molecular weight of the adhesive resin forming the adhesive porous layer, the composition of the material for forming the adhesive porous layer, the forming conditions, etc.
(Gurley Number)

In the separator of the invention, the difference (Gurley difference) $\Delta G$ between the Gurley number $G_B$ of the porous substrate and the Gurley number $G_S$ of the composite membrane is 75 sec/100 cc or less. When the Gurley difference $\Delta G$ ($=|G_B-G_S|$) is more than 75 sec/100 cc, the pores of the adhesive porous layer and the pores of the porous substrate do not sufficiently communicate with each other at the interface between the two layers. Accordingly, ion permeation is inhibited, and sufficient battery characteristics cannot be obtained. From such a point of view, the Gurley difference $\Delta G$ is preferably 70 sec/100 cc or less, more preferably 65 sec/100 cc or less, and still more preferably 60 sec/100 cc or less.

Incidentally, the Gurley number $G_B$ of the porous substrate and the Gurley number $G_S$ of the composite membrane (separator) can be measured by a Gurley densometer (G-B2C manufactured by Toyo Seiki) in accordance with JIS P8117.

In terms of obtaining sufficient battery performance, it is preferable that the Gurley number $G_S$ of the composite membrane is within a range of 50 sec/100 cc or more and 800 sec/100 cc or less.

Further, in terms of the uniformity of ion permeability and of enhancing battery cycle characteristics, it is preferable that the ratio [$SD_{GS}/AV_{GS}$] of the standard deviation $SD_{GS}$ of the Gurley number $G_S$ of the composite membrane to the mean $AV_{GS}$ of the Gurley number $G_S$ of the composite membrane is 0.3 or less.

$SD_{GS}/AV_{GS}$ serves as an index that indicates the uniformity of Gurley number in the entire separator. Smaller $SD_{GS}/AV_{GS}$ indicates higher Gurley number uniformity in the entire separator.

As mentioned above, a separator serves to allow for the smooth permeation of lithium ions and the like in the electrolyte, and, in order to suppress a decrease in battery life, it is desirable that ions permeate uniformly over the entire separator without being concentrated on a part of the separator. When the Gurley number varies from place to place in the separator, this means that the permeation of ions tends to be uneven, that is, for example, ions easily permeate in some parts of the separator, while permeation is difficult in other parts. Therefore, by enhancing the uniformity of Gurley number in the entire separator, ion permeability can be maintained at the same level regardless of the position in the separator. Consequently, it is possible to suppress local degradation resulting from the back-and-forth movement of ions only through parts where ion permeation is easy, and the ion permeability of the separator can be maintained even after repeated charging and discharging.

That is, when $SD_{GS}/AV_{GS}$ is 0.3 or less, cycle characteristics, i.e., the capability of maintaining the battery capacity retention even after repeated charging and discharging, can be enhanced. From such a point of view, $SD_{GS}/AV_{GS}$ is more preferably 0.29 or less, still more preferably 0.25 or less, and particularly preferably 0.20 or less.

With respect to $SD_{GS}/AV_{GS}$, the Gurley number of a separator was measured at 20 arbitrary different points, and their mean and standard deviation were taken as $AV_{GS}$ and $SD_{GS}$, respectively. The mean of Gurley number $AV_{GS}$ is determined by dividing the sum of the Gurley numbers measured at 20 points by the number of data (20). The standard deviation of Gurley number $SD_{GS}$ is determined by squaring the difference between each Gurley number and the mean $AV_{GS}$, dividing the sum of the squares by "the number of data−1", that is, 19, and taking the square root of the quotient.

In addition, $SD_{GS}/AV_{GS}$ can be controlled, for example, by the adjustment of the molecular weight of the adhesive resin forming the adhesive porous layer, the composition of the material for forming the adhesive porous layer, the forming conditions, etc.

(Tortuosity)

In the separator of the invention, the difference (tortuosity difference) $\Delta\tau$ between the tortuosity $\tau_B$ of the porous substrate and the tortuosity $\tau_S$ of the composite membrane is 0.30 or less. It is believed that a tortuosity difference $\Delta\tau$ ($=|\tau_B-\tau_S|$) of more than 0.30 leads to an increase in the proportion of pores on the porous substrate surface closed with the adhesive porous layer. This results in an increase in membrane resistance, making it impossible to sufficiently obtain battery rate characteristics (charge-discharge capacity retention characteristics) and cycle characteristics. From such a point of view, the tortuosity difference $\Delta\tau$ is preferably 0.25 or less, and preferably 0.20 or less.

Further, in terms of ensuring excellent ion permeability, it is preferable that the tortuosity $\tau_S$ of the separator is within a range of 1.5 to 2.5

Incidentally, tortuosity $\tau$ is a ratio ($L_P/L_S$) between the pore length $L_P$ through the separator from one side to the other side and the separator thickness $L_S$. Therefore, when pores are not curved but are straight, the tortuosity is 1, and the tortuosity increases as pores are curved. There are some tortuosity calculation methods, specific examples thereof including a method of calculation from membrane resistance and a method of calculation from air permeability. When battery characteristics are taken into consideration, the method of calculation from membrane resistance is preferable.

In the invention, the tortuosity $\tau_B$ of the porous substrate and the tortuosity $\tau_S$ of the composite membrane are each the tortuosity of a sample as impregnated with an electrolyte and calculated based on the following formula.

$$\tau = \{(R\cdot\epsilon/100)/(r\cdot t)\}^{1/2}$$

$\tau$: Tortuosity of sample ($\tau_B$ or $\tau_S$)
R (ohm·cm$^2$): Resistance of sample as impregnated with electrolyte
r (ohm·cm): Specific resistance of electrolyte
$\epsilon$ (%): Porosity
t (cm): Thickness of sample (Physical Properties of Separator)

In order for the advantage of the invention and the mechanical properties of the separator to be well obtained, it is preferable that the separator for a nonaqueous electrolyte battery has a porosity within a range of 30% or more and 60% or less.

In terms of mechanical strength and energy density, it is preferable that the separator has a thickness of 5 μm to 35 μm.

In terms of ensuring sufficient load characteristics for a battery, it is preferable that the separator has a membrane resistance within a range of 1 ohm·cm$^2$ to 10 ohm·cm$^2$.

Membrane resistance herein refers to the resistance of the separator as impregnated with an electrolyte, and is measured by an alternating-current method. The resistance naturally depends on the kind of electrolyte and the temperature, and the above value is a value measured at 20° C. using 1 M LiBF$_4$ propylene carbonate/ethylene carbonate (1/1 mass ratio) as the electrolyte.

[Porous Substrate]

The porous substrate in the invention means a substrate having pores or voids inside.

Examples of such substrates include microporous membranes, porous sheets made of a fibrous material, such as nonwoven fabrics and paper-like sheets, and composite porous sheets including such a microporous membrane or porous sheet as well as one or more other porous layers laminated thereon. Incidentally, a microporous membrane is a membrane having a large number of micropores inside and configured such that the micropores are connected to allow gas or liquid to pass from one side to the other side.

In terms of imparting a shutdown function, a thermoplastic resin is used as a material for forming the porous substrate. As the thermoplastic resin, a thermoplastic resin having a melting point of less than 200° C. is suitable, and polyolefins are particularly preferable.

As a porous substrate using a polyolefin, a polyolefin microporous membrane is preferable. As the polyolefin microporous membrane, it is possible to use a polyolefin microporous membrane that has been applied to conventional nonaqueous electrolyte battery separators, which has sufficient mechanical properties and ion permeability. Further, in terms of having the shutdown function mentioned above, it is preferable that the polyolefin microporous membrane contains polyethylene, and it is preferable that the polyethylene content is 95 mass % or more.

Additionally, in terms of providing the porous substrate with heat resistance that prevents the porous substrate from easily breaking when exposed to high temperatures, a polyolefin microporous membrane containing polyethylene and polypropylene is preferable as the material forming the porous substrate. An example of such a polyolefin microporous membrane is a microporous membrane in which both polyethylene and polypropylene are present in one membrane. In terms of achieving both a shutdown function and heat resistance, it is preferable that the microporous membrane contains 95 mass % or more polyethylene and 5 mass % or less polypropylene. In addition, in terms of achieving both a shutdown function and heat resistance, it is also preferable that the polyolefin microporous membrane has a laminated structure including at least two layers, in which one of the two layers contains polyethylene, while the other layer contains polypropylene.

It is preferable that the polyolefin has a weight average molecular weight of 100,000 to 5,000,000. A weight average molecular weight of less than 100,000 may make it difficult to ensure sufficient mechanical properties. Meanwhile, a weight average molecular weight of more than 5,000,000 may deteriorate shutdown characteristics or make formation difficult.

Such a polyolefin microporous membrane can be produced by the following methods, for example. That is, a method that forms a microporous membrane by successively performing the following steps can be mentioned: (i) a step of extruding a molten polyolefin resin from a T-die to form a sheet, (ii) a step of subjecting the sheet to a crystallization treatment, (iii) a step of stretching the sheet, and (iv) a step of heat-treating the sheet. Alternatively, a method that forms a microporous membrane by successively performing the following steps can also be mentioned, for example: (i) a step of melting a polyolefin resin together with a plasticizer such as liquid paraffin and extruding the melt from a T-die, followed by cooling to form a sheet, (ii) a step of stretching the sheet, (iii) a step of extracting the plasticizer from the sheet, and (iii) a step of heat-treating the sheet.

As a porous sheet made of a fibrous material, it is possible to use a porous sheet made of a fibrous material made of a polyester such as polyethylene terephthalate, a polyolefin such as polyethylene or polypropylene, or a mixture of these fibrous materials.

A composite porous sheet may be configured to include a microporous membrane or a porous sheet made of a fibrous material as well as a functional layer laminated thereon. The composite porous sheet is preferable in that further functions can be imparted by the functional layer. In terms of imparting heat resistance, for example, the functional layer may be a porous layer made of a heat-resistant resin or a porous layer made of a heat-resistant resin and an inorganic filler. The heat-resistant resin may be one or more kinds of heat-resistant polymers selected from aromatic polyamide, polyimide, polyethersulfone, polysulfone, polyether ketone, and polyetherimide. As the inorganic filler, metal oxides such as alumina and metal hydroxides such as magnesium hydroxide can be preferably used. Incidentally, examples of compositing techniques include a method in which a porous sheet is coated with a functional layer, a method in which they are joined together using an adhesive, and a method in which they are bonded together by thermocompression.

(Physical Properties of Porous Substrate)

In the invention, the Gurley number $G_B$ of the porous substrate is not particularly limited as long as the $\Delta G$ is within a range that satisfies the above condition, but is preferably 50 sec/100 cc or more and 800 sec/100 cc or less. In terms of preventing short circuits in a battery, the Gurley number $G_B$ of the porous substrate is preferably 50 sec/100 cc or more, more preferably 90 sec/100 cc or more, and still more preferably 120 sec/100 cc or more. In addition, ion permeability is excellent when the Gurley number $G_B$ of the porous substrate is 800 sec/100 cc or less, more preferably 500 sec/100 cc or less.

The tortuosity $\tau_B$ of the porous substrate is not particularly limited either as long as the $\Delta\tau$ is within a range that satisfies the above condition. In terms of obtaining sufficient ion permeability, $\tau_B$ is preferably 5.0 or less, more preferably 4.0 or less, and still more preferably 3.0 or less.

With respect to the pore size of the porous substrate, the smaller the pore size, the larger the non-porous area, resulting in an increased area of bonding to the adhesive porous layer, whereas adhesion between the porous substrate and the adhesive porous layer is improved. In addition, the larger the pore size, the better the ion permeability.

From such a point of view, the average pore size of the porous substrate is preferably 1 nm or more, more preferably 10 nm or more, and still more preferably 20 nm or more. In addition, the average pore size of the porous substrate is preferably 300 nm or less, more preferably 200 nm or less, and still more preferably 100 nm or less.

Incidentally, assuming that all pores are cylindrical, the average pore size $d_B$ of the porous substrate is calculated from the following equation using the pore surface area $S_B$ of the porous substrate calculated from the amount of nitrogen gas adsorption and the pore volume $V_B$ of the porous substrate calculated from porosity.

$$d_B = 4 \times V_B / S_B$$

$d_B$: Average pore size of porous substrate
$V_B$: Pore volume of porous substrate
$S_B$: Pore surface area of porous substrate In order to determine the pore surface area $S_B$ (m$^2$/g) of a porous substrate, first, the specific surface area (m$^2$/g) of the applied porous substrate is measured by a nitrogen gas adsorption method. Next, the specific surface area of the porous substrate is multiplied by the areal weight (g/m$^2$) of the porous substrate to determine the pore surface area $S_B$ (m$^2$/g) per m$^2$ of the porous substrate.

In the invention, in terms of obtaining excellent mechanical properties and internal resistance, it is preferable that the porous substrate has a thickness within a range of 5 μm to 25 μm.

In terms of improving the production yield, it is preferable that the porous substrate has a puncture resistance of 300 g or more.

[Adhesive Porous Layer]

The adhesive porous layer is provided on at least one side of the porous substrate and contains an adhesive resin. The adhesive porous layer means a porous layer having a large number of micropores inside and configured such that the micropores are connected to allow gas or liquid to pass from one side to the other side.

The adhesive porous layer is provided as the outermost layer(s) of the separator on one side or both sides of the porous substrate. The adhesive porous layer allows for bonding to an electrode. That is, when the separator and an electrode are stacked and hot-pressed, the adhesive porous layer can bond the separator to the electrode. In the case where the separator for a nonaqueous electrolyte battery of the invention has the adhesive porous layer only on one side of the porous substrate, the adhesive porous layer adheres to either of the positive electrode or the negative electrode. In addition, in the case where the separator for a nonaqueous electrolyte battery of the invention has the adhesive porous layer on both sides of the porous substrate, the adhesive porous layer adheres to both the positive electrode and the negative electrode. When the adhesive porous layer is present on both sides of the porous substrate, both sides of the separator adhere well to both electrodes via the adhesive porous layer. This provides a battery with excellent cycle characteristics and thus is preferable.

(Adhesive Resin)

The adhesive resin is not particularly limited as long as it easily adheres to electrodes. Preferred examples thereof include polyvinylidene fluoride, polyvinylidene fluoride copolymers, styrene-butadiene copolymers, polyvinyl alcohol, homopolymers and copolymers of vinyl nitriles such as acrylonitrile and methacrylonitrile, and polyethers such as polyethylene oxide and polypropylene oxide. In particular, polyvinylidene fluoride and polyvinylidene fluoride copolymers (these are referred to as "polyvinylidene fluoride resin") are particularly preferable. The adhesive porous layer may contain only one kind of adhesive resin, or may also contain two or more kinds.

Examples of polyvinylidene fluoride resins include a homopolymer of vinylidene fluoride (i.e., polyvinylidene fluoride), copolymers of vinylidene fluoride and another copolymerizable monomer, and mixtures thereof. Examples of monomers copolymerizable with vinylidene fluoride include tetrafluoroethylene, hexafluoropropylene, trifluoroethylene, trichloroethylene, and vinyl fluoride. They can be used alone, or it is also possible to use two or more kinds. Such a polyvinylidene fluoride resin can be obtained by emulsion polymerization or suspension polymerization.

Among polyvinylidene fluoride resins, in terms of adhesion to electrodes, copolymers copolymerized with at least vinylidene fluoride and hexafluoropropylene are preferable. Further, copolymers having a structural unit derived from vinylidene fluoride and a structural unit derived from hexafluoropropylene in an amount of 0.1 mol % or more and 5 mol % or less (preferably 0.5 mol % or more and 2 mol % or less) by mass are more preferable.

As a polyvinylidene fluoride resin, one having a weight average molecular weight within a range of 500,000 to 3,000,000 is preferable. When the weight average molecular weight is 500,000 or more, the adhesive porous layer can be provided with mechanical properties that can withstand the step of bonding to electrodes, making it easy to obtain sufficient adhesion. From such a point of view, the weight average molecular weight of the polyvinylidene fluoride resin is preferably 600,000 or more, and still more preferably 700,000 or more. When the weight average molecular weight of the polyvinylidene fluoride resin is 3,000,000 or less, the adhesive porous layer has excellent formability. This results in excellent crystal formation in the adhesive porous layer, making it possible to obtain a suitable porous structure. From such a point of view, the weight average molecular weight of the polyvinylidene fluoride resin is preferably 2,500,000 or less, and preferably 2,000,000 or less. When the weight average molecular weight of the polyvinylidene fluoride resin is within a range of 500,000 to 3,000,000, this is also preferable for the reason that it is easy to adjust the Gurley difference $\Delta G$, tortuosity difference $\Delta \tau$, and $SD_{GS}/AV_{GS}$ mentioned above to be within the ranges of the invention.

(Additive)

Without interfering with the advantage of the invention, the adhesive porous layer may also contain a filler made of an inorganic substance or an organic substance and other additives.

The presence of a filler in the adhesive porous layer can improve the slidability and heat resistance of the separator. Examples of usable inorganic fillers include metal oxides such as alumina and metal hydroxides such as magnesium hydroxide. Examples of usable organic fillers include acrylic resins and methacrylate resins.

It is preferable that the content of additive in the adhesive porous layer is 1 mass % to 95 mass % relative to the total mass of the adhesive porous layer.

(Physical Properties of Adhesive Porous Layer)

In the invention, it is preferable that the adhesive porous layer has an average pore size of 1 nm to 100 nm. When the average pore size of the adhesive porous layer is 100 nm or less, a porous structure in which uniform pores are uniformly dispersed is likely to be obtained, whereby points of bonding to an electrode can be uniformly dispersed, resulting in excellent adhesion. In addition, in that case, ion migration is also uniform, whereby sufficient cycle characteristics can be obtained, and further excellent load characteristics can be obtained. Meanwhile, although it is preferable, in terms of uniformity, that the average pore size is as small as possible, it is practically difficult to form a porous structure of less than 1 nm. In addition, in the case where the adhesive porous layer is impregnated with an electrolyte, the polyvinylidene fluoride resin swells, and, when the average pore size is too small, the pores are closed due to swelling, and ion permeability is thus inhibited. Also from such a point of view, it is preferable that the average pore size is 1 nm or more. The average pore size of the adhesive porous layer is more preferably 20 nm to 100 nm.

Incidentally, assuming that all pores are cylindrical, the average pore size $d_A$ of the adhesive porous layer is calculated from the following equation using the pore surface area $S_A$ of the adhesive porous layer calculated from the amount of nitrogen gas adsorption and the pore volume $V_A$ of the adhesive porous layer calculated from porosity.

$$d_A = 4 \times V_A / S_A$$

$d_A$: Average pore size of adhesive porous layer
$V_A$: Pore volume of adhesive porous layer
$S_A$: Pore surface area of adhesive porous layer In order to determine the pore surface area $S_A$ of an adhesive porous layer, first, the specific surface area (m$^2$/g) of the applied porous substrate and the specific surface area (m$^2$/g) of the separator having the adhesive porous layer are measured by a nitrogen gas adsorption method. Then, the specific surface areas are multiplied by the respective areal weights (g/m$^2$) to determine the pore surface areas per unit area of the separator, and the pore surface area of the porous substrate is subtracted from the pore surface area of the separator to calculate the pore surface area $S_A$ of the adhesive porous layer.

In the invention, in the case where the adhesive porous layer is applied to and formed on both sides of the porous substrate, the coat weight of the adhesive porous layer on one side of the porous substrate is preferably 0.5 g/m$^2$ to 1.5 g/m$^2$, and more preferably 0.7 g/m$^2$ to 1.3 g/m$^2$. When the coat weight is 0.5 g/m$^2$ or more, this leads to even better adhesion between the adhesive porous layer and electrodes. Meanwhile, when the coat weight is 1.5 g/m$^2$ or less, even better ion permeability is likely to be ensured.

In the case where the adhesive porous layer is provided on both sides of the porous substrate, the difference between the coat weight on one side and the coat weight on the other side is preferably 20 mass % or less of the total coat weight on both sides. When the difference is 20 mass % or less, the separator is resistant to curling. This results in good handleability, and also the problem of decreased cycle characteristics is unlikely to occur.

It is preferable that the thickness of the adhesive porous layer on one side of the porous substrate is 0.3 µm to 5 µm. When the thickness is 0.3 µm or more, this leads to even better adhesion to electrodes. When the thickness is 5 µm or less, excellent ion permeability is ensured, providing a battery with excellent load characteristics. From such a point of view, the thickness of the adhesive porous layer on one side of the porous substrate is more preferably 0.5 µm to 5 µm, and still more preferably 1 µm to 2 µm.

In the invention, in terms of ion permeability, it is preferable that the structure of the adhesive porous layer is sufficiently porous. Specifically, it is preferable that the adhesive porous layer has a porosity of 30% to 60%. When the porosity is 30% or more, ion permeability is excellent, leading to even better battery characteristics. In addition, a porosity of 60% or less provides mechanical properties sufficient to prevent the porous structure from being destroyed upon bonding to an electrode by hot pressing. In addition, a porosity of 60% or less provides low surface porosity, leading to an increase in the area occupied by the adhesive resin, whereby even better adhesion strength can be ensured. Incidentally, it is more preferable that the porosity of the adhesive porous layer is within a range of 30 to 50%.

In terms of cycle characteristics, it is preferable that the adhesive resin in the adhesive porous layer has a fibril diameter within a range of 10 nm to 1,000 nm.

<Method for Producing Separator for Nonaqueous Electrolyte Battery>

The separator for a nonaqueous electrolyte battery of the invention can be produced, for example, by a method in which a porous substrate is coated thereon with a coating liquid containing an adhesive resin, such as a polyvinylidene fluoride resin, to form a coating layer, and then the resin of the coating layer is solidified, thereby integrally forming an adhesive porous layer on the porous substrate.

The following describes the case where the adhesive porous layer is formed using a polyvinylidene fluoride resin.

An adhesive porous layer using a polyvinylidene fluoride resin as the adhesive resin can be preferably formed by the following wet coating method, for example.

The wet coating method is a film-forming method including (i) a step of dissolving a polyvinylidene fluoride resin in a suitable solvent to prepare a coating liquid, (ii) a step of coating a porous substrate with the coating liquid, (iii) a step of immersing the porous substrate in a suitable coagulation liquid to induce phase separation and solidify the polyvinylidene fluoride resin, (iv) a step of washing with water, and (v) a step of drying, thereby forming a porous layer on the porous substrate. The details of a wet coating method suitable for the invention are as follows.

As a solvent that dissolves a polyvinylidene fluoride resin (hereinafter sometimes referred to as "good solvent") used for the preparation of a coating liquid, it is preferable to use a polar amide solvent such as N-methylpyrrolidone, dimethylacetamide, dimethylformamide, or dimethylformamide.

In terms of forming an excellent porous structure, in addition to the good solvent, it is preferable to mix a phase-separating agent that induces phase separation. Examples of phase-separating agents include water, methanol, ethanol, propyl alcohol, butyl alcohol, butanediol, ethylene glycol, propylene glycol, and tripropylene glycol. It is preferable that the phase-separating agent is added within a range where viscosity suitable for coating can be ensured.

In terms of forming an excellent porous structure, it is preferable that the solvent is a mixed solvent containing 60 mass % or more a good solvent and 40 mass % or less a phase-separating agent.

In terms of forming an excellent porous structure, it is preferable that the coating liquid contains the polyvinylidene fluoride resin at a concentration of 3 to 10 mass %.

In the case where a filler or other components are added to the adhesive porous layer, they may be mixed with or dissolved in the coating liquid.

In general, a coagulation liquid contains the good solvent and phase-separating agent used for the preparation of a coating liquid and water. In terms of production, it is preferable that the mixing ratio between the good solvent and the phase-separating agent is determined according to the mixing ratio in the mixed solvent used for dissolving a polyvinylidene fluoride resin. In terms of the formation of a porous structure and productivity, it is suitable that the concentration of water is 40 mass % to 90 mass %.

The coating of a porous substrate with the coating liquid may be performed using a conventional coating technique, such as a Mayer bar, a die coater, a reverse roll coater, or a gravure coater. In the case where an adhesive porous layer is formed on both sides of the porous substrate, in terms of productivity, it is preferable that both sides of the substrate are simultaneously coated with the coating liquid.

In addition to the wet coating method mentioned above, the adhesive porous layer can also be produced by a dry coating method. A dry coating method herein is a method in which, for example, a porous substrate is coated with a coating liquid containing a polyvinylidene fluoride resin and a solvent, and then the resulting coating layer is dried to volatilize the solvent away, thereby giving a porous layer. However, as compared with the wet coating method, the dry coating method tends to give a dense coating layer. Accordingly, in terms of obtaining an excellent porous structure, the wet coating method is more preferable.

The separator for a nonaqueous electrolyte battery of the invention can also be produced by a method in which an adhesive porous layer is formed as an independent sheet, then the adhesive porous layer is placed on a porous substrate, and they are composited by thermocompression bonding or using an adhesive. The method for producing an adhesive porous layer as an independent sheet may be a method in which a release sheet is coated thereon with a coating liquid containing a resin, then an adhesive porous layer is formed by the wet coating method or dry coating method mentioned above, and the adhesive porous layer is peeled off the release sheet.

<Nonaqueous Electrolyte Battery>

The nonaqueous electrolyte battery of the invention is a nonaqueous electrolyte battery whose electromotive force is obtained by lithium doping/dedoping, and is configured to include a positive electrode, a negative electrode, and the separator for a nonaqueous electrolyte battery of the invention mentioned above. Incidentally, doping means occlusion, support, adsorption, or intercalation, and refers to the phenomenon that lithium ions enter the active material of an electrode such as a positive electrode.

A nonaqueous electrolyte battery is configured such that a battery element, which includes an electrolyte-impregnated structure having a negative electrode and a positive electrode facing each other via a separator, is enclosed in an outer casing material. The nonaqueous electrolyte battery of the invention is suitable for a nonaqueous electrolyte secondary battery, particularly a lithium ion secondary battery.

The nonaqueous electrolyte battery of the invention includes, as a separator, the separator for a nonaqueous electrolyte battery of the invention mentioned above, and thus has excellent adhesion between the electrodes and the separator. At the same time, the yield in the production process is high, and electrolyte retention is also excellent. Accordingly, the nonaqueous electrolyte battery of the invention develops stable cycle characteristics.

The positive electrode may be configured such that an active material layer containing a positive electrode active material and a binder resin is formed on a collector. The active material layer may further contain an electrically conductive auxiliary.

Examples of positive electrode active materials include lithium-containing transition metal oxides. Specific examples thereof include $LiCoO_2$, $LiNiO_2$, $LiMn_{1/2}Ni_{1/2}O_2$, $LiCo_{1/3}Mn_{1/3}Ni_{1/3}O_2$, $LiMn_2O_4$, $LiFePO_4$, $LiCo_{1/2}Ni_{1/2}O_2$, and $LiAl_{1/4}Ni_{3/4}O_2$.

Examples of binder resins include polyvinylidene fluoride resins and styrene-butadiene copolymers.

Examples of electrically conductive auxiliaries include carbon materials such as acetylene black, ketjen black, and graphite powder.

Examples of collectors include aluminum foils, titanium foils, and stainless steel foils having a thickness of 5 μm to 20 μm.

In the nonaqueous electrolyte battery of the invention, in the case where the separator includes an adhesive porous layer containing a polyvinylidene fluoride resin, and the adhesive porous layer is disposed on the positive electrode side, because the polyvinylidene fluoride resin has excellent oxidation resistance, it is easy to apply a positive electrode active material that can be operated at a high voltage of 4.2 V or more, such as $LiMn_{1/2}Ni_{1/2}O_2$ or $LiCo_{1/3}Mn_{1/3}Ni_{1/3}O_2$; thus, this is advantageous.

The negative electrode may be configured such that an active material layer containing a negative electrode active material and a binder resin is formed on a collector. The active material layer may further contain an electrically conductive auxiliary.

Examples of negative electrode active materials include materials capable of electrochemically occluding lithium. Specific examples thereof include carbon materials, silicon, tin, aluminum, and Wood's alloy.

Examples of binder resins include polyvinylidene fluoride resins and styrene-butadiene copolymers.

Examples of electrically conductive auxiliaries include carbon materials such as acetylene black, ketjen black, and graphite powder.

Examples of collectors include copper foils, nickel foils, and stainless steel foils having a thickness of 5 μm to 20 μm.

In addition, instead of such a negative electrode, a metal lithium foil may also be used as the negative electrode.

The electrolyte is a solution obtained by dissolving a lithium salt in a nonaqueous solvent.

Examples of lithium salts include $LiPF_6$, $LiBF_4$, and $LiClO_4$.

Examples of nonaqueous solvents include cyclic carbonates such as ethylene carbonate, propylene carbonate, fluoroethylene carbonate, and difluoroethylene carbonate; linear carbonates such as dimethyl carbonate, diethyl carbonate, ethyl methyl carbonate, and fluorine substitutions thereof; and cyclic esters such as γ-butyrolactone and γ-valerolactone. They may be used alone or may also be mixed and used.

As the electrolyte, one obtained by mixing a cyclic carbonate and a linear carbonate in a mass ratio (cyclic carbonate/linear carbonate) of 20/80 to 40/60 and dissolving a lithium salt therein at 0.5 M to 1.5 M is preferable.

Examples of outer casing materials includes metal cans and packs formed from an aluminum laminate film.

The shape of batteries may be prismatic, cylindrical, coin-type, etc., and the separator for a nonaqueous electrolyte battery of the invention is suitable for any shape.

EXAMPLES

Hereinafter, the invention will be described in further detail with reference to examples. However, within the gist thereof, the invention is not limited to the following examples.

[Measurement Methods]

Separators and lithium ion secondary batteries produced in the following examples and comparative example were measured and evaluated as follows.

(Gurley Number)

Measurement was performed in accordance with JIS P8117 using a Gurley densometer (G-B2C manufactured by Toyo Seiki).

(Tortuosity)

The tortuosity $\tau_B$ of a porous substrate and the tortuosity $\tau_S$ of a composite membrane (separator) were measured as follows. Using 1 M $LiBF_4$ propylene carbonate/ethylene carbonate (=1/1 mass ratio) as an electrolyte, a sample (porous substrate or separator) was impregnated with the electrolyte, then sandwiched between aluminum foil electrodes each provided with a lead tab, and enclosed in an aluminum pack to produce a test cell. The resistance of the test cell was measured at 20° C. and −20° C. by an alternating current impedance method (measurement frequency: 100 kHz). From the obtained resistance at 20° C., the tortuosity of the sample was calculated using the following equation.

$$\tau = \{(R \cdot \epsilon/100)/(r \cdot t)\}^{1/2}$$

τ: Tortuosity of sample

R (ohm·cm²): Resistance of sample as impregnated with electrolyte r (ohm·cm): Specific resistance of electrolyte ϵ (%): Porosity t (cm): Thickness of sample ($SD_{GS}/AV_{GS}$)

With respect to the ratio [$SD_{GS}/AV_{GS}$] of the standard deviation $SD_{GS}$ of the Gurley number $G_S$ of a composite membrane (separator) to the mean $AV_{GS}$ of the Gurley number $G_S$ of the composite membrane (separator), the Gurley number of the separator was measured at 20 arbitrary different points, and $SD_{GS}$ and $AV_{GS}$ were calculated from the obtained values.

(Thickness)

Measurement was performed using a contact thickness meter (LITEMATIC manufactured by Mitutoyo Corporation). A cylindrical terminal 5 mm in diameter was used as a measuring terminal, and it was adjusted to apply a load of 7 g during the measurement.

(Areal Weight)

A 10 cm×10 cm sample was cut out and measured for mass. The mass was divided by the area to determine the areal weight.

(Coat Weight of Polyvinylidene Fluoride Resin)

Using an energy dispersion fluorescent X-ray analyzer (EDX-800HS, Shimadzu Corporation), the coat weight (mass) of a polyvinylidene fluoride resin was measured from the FKα spectral intensity. In the measurement, the polyvinylidene fluoride resin mass on the X-ray irradiated side is measured. Therefore, in the case where a porous layer made of a polyvinylidene fluoride resin is formed on both front and back sides, the front and back are each subjected to the measurement. Thus, the polyvinylidene fluoride resin masses on the front and back are measured, and they are summed to determine the total mass on the front and back.

(Porosity)

The porosity of a separator was calculated by the following equation.

$$\epsilon = \{1 - Ws/(ds \cdot t)\} \times 100$$

Here, ε is porosity (%), Ws is areal weight (g/m$^2$), ds is true density (g/cm$^3$), and t is thickness (μm).

The porosity ε (%) of a separator formed of a laminate of a polyethylene porous substrate and a porous layer made only of a polyvinylidene fluoride resin was calculated by the following equation.

$$\epsilon = \{1 - (Wa/0.95 + Wb/1.78)/t\} \times 100$$

Here, Wa is the areal weight of the substrate (g/m$^2$), Wb is the weight of the polyvinylidene fluoride resin (g/m$^2$), and t is thickness (μm).

In the case where the porosity of an adhesive porous layer is calculated, it can be determined from the above equation, provided that Wa=0 (g/m$^2$), and t is the thickness of the adhesive porous layer, i.e., the value obtained by subtracting the substrate thickness from the separator thickness.

(Weight Average Molecular Weight of Polyvinylidene Fluoride Resin)

The weight average molecular weight (Dalton) of a polyvinylidene fluoride resin is a polystyrene-equivalent molecular weight measured by gel permeation chromatography (hereinafter sometimes referred to as GPC) under the following conditions.

<Condition>

GPC: Alliance GPC 2000 [manufactured by Waters Corporation]

Column: TSKgel GMH$_6$-HT×2+TSKgel GMH$_6$-HTL×2 [manufactured by Tosoh Corporation]

Mobile phase solvent: o-Dichlorobenzene

Reference sample: Monodisperse polystyrene [manufactured by Tosoh Corporation]

Column temperature: 140° C.

(Average Pore Size of Adhesive Porous Layer)

By a BET gas adsorption method, the specific surface area (m$^2$/g) of a porous substrate and the specific surface area (m$^2$/g) of a composite membrane including an adhesive porous layer were measured. These specific surface areas (m$^2$/g) were multiplied by the respective areal weights (g/m$^2$) to calculate the pore surface areas per m$^2$ of sheet. The pore surface area of the porous substrate was subtracted from the pore surface area of the composite membrane to calculate the pore surface area S$_A$ per m$^2$ of the adhesive porous layer. Separately, the pore volume V$_A$ of the adhesive porous layer per m$^2$ of sheet was calculated from porosity. Assuming that all pores were cylindrical, the average pore size d$_A$ of the adhesive porous layer was calculated from the following equation using the pore surface area S$_A$ and pore volume V$_A$ of the adhesive porous layer.

$$d_A = 4 \times V_A / S_A$$

d$_A$: Average pore size of adhesive porous layer

V$_A$: Pore volume of adhesive porous layer

S$_A$: Pore surface area of adhesive porous layer

Example 1

As a polyvinylidene fluoride resin, a copolymer of vinylidene fluoride/hexafluoropropylene (=98.9/1.1 mol %) having a weight average molecular weight of 1,800,000 was used.

The polyvinylidene fluoride resin was dissolved at a concentration of 5 mass % in a mixed solvent of dimethylacetamide/tripropylene glycol (=7/3 mass ratio) to prepare a coating liquid. Both sides of a polyethylene microporous membrane having a thickness of 9 μm, a Gurley number of 160 sec/100 cc, a porosity of 43% were coated with the same amount of the coating liquid, followed by immersion in a coagulation liquid (40° C.) containing water/dimethylacetamide/tripropylene glycol (=57/30/13 mass ratio) to cause solidification. It was then washed with water and dried to give a separator for a nonaqueous electrolyte battery according to the invention, including an adhesive porous layer made of a polyvinylidene fluoride resin formed on both front and back sides of a polyolefin microporous membrane.

With respect to this separator, Table 1 shows the results of the measurement of the Gurley numbers (G$_B$ and G$_S$) of the porous substrate and the separator (composite membrane), the Gurley difference ΔG (=|G$_B$−G$_S$|), the tortuosities (τ$_B$ and τ$_S$) of the porous substrate and the separator, the tortuosity difference Δτ (=|τ$_B$−τ$_S$|), SD$_{GS}$/AV$_{GS}$ of the separator, the weight average molecular weight (Mw) of the polyvinylidene fluoride resin (PVdF), the concentration of the phase-separating agent in the coating liquid, the concentration of water in the coagulation liquid, and the temperature of the coagulation liquid.

The separators of the following examples and comparative example are also summarized in Table 1.

Examples 2 to 6 and Comparative Example 1

Separators for a nonaqueous electrolyte battery of Examples 2 to 6 and Comparative Example 1 were obtained in the same manner as in Example 1, except that the phase-separating agent concentration, the water concentration, and the coagulation liquid temperature were changed as shown in Table 1.

Examples 7 and 8

Separators for a nonaqueous electrolyte battery of Examples 7 and 8 were obtained in the same manner as in Example 1, except that a vinylidene fluoride-hexafluoropropylene copolymer having a weight average molecular weight of 500,000 or 3,000,000 was used as an adhesive resin.

TABLE 1

| | Separator (Composite Membrane) | | | | | | |
|---|---|---|---|---|---|---|---|
| | Porous Substrate | | | | Coating Liquid Phase-Separating Agent Concentration | Coagulation Liquid | |
| | $G_B$ | $\tau_B$ | Adhesive Resin | | | Water Concentration | Temperature |
| | | | Kind | MW | | | |
| | sec/100 cc | — | | | mass % | mass % | ° C. |
| Example 1 | 160 | 1.98 | PVDF | 1,800,000 | 30 | 57 | 40 |
| Example 2 | 160 | 1.98 | PVDF | 1,800,000 | 33 | 58 | 38 |
| Example 3 | 160 | 1.98 | PVDF | 1,800,000 | 23 | 56 | 42 |
| Example 4 | 160 | 1.98 | PVDF | 1,800,000 | 35 | 40 | 30 |
| Example 5 | 160 | 1.98 | PVDF | 1,800,000 | 25 | 55 | 20 |
| Example 6 | 160 | 1.98 | PVDF | 1,800,000 | 40 | 40 | 35 |
| Example 7 | 160 | 1.98 | PVDF | 500,000 | 30 | 45 | 40 |
| Example 8 | 160 | 1.98 | PVDF | 3,000,000 | 20 | 30 | 30 |
| Comparative Example 1 | 160 | 1.98 | PVDF | 1,800,000 | 30 | 60 | 41 |

| | Separator (Composite Membrane) | | | | | |
|---|---|---|---|---|---|---|
| | Average Pore Size of Adhesive Porous Layer | $G_s$ | $\tau_S$ | $SD_{GS}/AV_{GS}$ | $\Delta G$ | $\Delta \tau$ |
| | nm | sec/100 cc | — | — | sec/100 cc | — |
| Example 1 | 60 | 230 | 2.16 | 0.19 | 70 | 0.18 |
| Example 2 | 80 | 210 | 2.01 | 0.20 | 50 | 0.03 |
| Example 3 | 50 | 230 | 2.23 | 0.24 | 70 | 0.25 |
| Example 4 | 90 | 180 | 2.21 | 0.10 | 20 | 0.23 |
| Example 5 | 95 | 195 | 2.25 | 0.35 | 35 | 0.27 |
| Example 6 | 110 | 230 | 2.18 | 0.28 | 70 | 0.20 |
| Example 7 | 97 | 200 | 2.15 | 0.20 | 40 | 0.17 |
| Example 8 | 35 | 233 | 2.25 | 0.23 | 73 | 0.27 |
| Comparative Example 1 | 32 | 240 | 2.38 | 0.40 | 80 | 0.40 |

[Measurement of Resistance of Separator Impregnated with Electrolyte]

Based on the tortuosity measurement method mentioned above, with respect to the separators produced in Example 1 and Comparative Example 1 and the above polyethylene microporous membrane, the resistance of the separator as impregnated with an electrolyte was measured at 20° C. and −20° C. The results are shown in Table 2. In addition, from the obtained resistance at 20° C., the tortuosity of the separator was calculated using the equation mentioned above. The results are also shown in Table 2.

Incidentally, in Table 2, "20° C." and "−20° C." show the resistances of each test cell at 20° C. and −20° C., respectively, and "20° C./−20° C." shows the ratio between the two.

TABLE 2

| | Results of Resistance Measurement | | | |
|---|---|---|---|---|
| | 20° C. (ohm · cm²) | Tortuosity — | −20° C. (ohm · cm²) | −20° C./20° C. |
| Example 1 | 3.22 | 2.16 | 12.8 | 4.0 |
| Comparative Example 1 | 4.05 | 2.38 | 28.1 | 6.9 |
| Polyethylene Microporous Membrane | 2.46 | 1.98 | 10.1 | 4.1 |

[Interpretation of Resistance Measurement Results]

Table 2 shows that membrane resistance increases with an increase in tortuosity, and the resistance increase is more significant at a low temperature.

[Production of Nonaqueous Electrolyte Battery]

Using the separators produced in Examples 1 to 8 and Comparative Example 1, nonaqueous electrolyte batteries of Examples 1 to 8 and Comparative Example 1 were produced according to the following procedure.

(Production of Negative Electrode)

300 g of artificial graphite as a negative electrode active material, 7.5 g of an aqueous dispersion containing 40 mass % a modified styrene-butadiene copolymer as a binder, 3 g of carboxymethyl cellulose as a thickener, and an appropriate amount of water were stirred in a double-arm mixer to prepare a slurry for a negative electrode. The slurry for a negative electrode was applied to a 10-μm-thick copper foil as a negative electrode collector, dried, and then pressed to give a negative electrode having a negative electrode active material layer.

(Production of Positive Electrode)

89.5 g of a lithium cobalt oxide powder as a positive electrode active material, 4.5 g of acetylene black as an electrically conductive auxiliary, and 6 g of polyvinylidene fluoride as a binder were dissolved in N-methyl-pyrrolidone (NMP) to a polyvinylidene fluoride concentration of 6 mass %, and stirred in a double-arm mixer to prepare a slurry for a positive electrode. The slurry for a positive electrode was applied to a 20-μm-thick aluminum foil as a positive electrode collector, dried, and then pressed to give a positive electrode having a positive electrode active material layer.

(Production of Battery)

A lead tab was welded to the positive electrode and the negative electrode. The positive and negative electrodes were joined together via a separator, impregnated with an electrolyte, and enclosed in an aluminum pack using a vacuum sealer. As the electrolyte, 1 M $LiPF_6$ ethylene carbonate/ethylmethyl carbonate (mass ratio: 3/7) was used. Using a hot press, under a load of 20 kg per $cm^2$ of electrode, the aluminum pack was hot-pressed at 90° C. for 2 minutes to produce a test battery.

[Load Characteristic (Rate Characteristic) Test]

The load characteristic test was performed using the nonaqueous electrolyte batteries produced above. The discharge capacity at 2 C relative to the discharge capacity at 0.2 C was measured at 25° C. and used as an index of battery load characteristics. The test was performed on the batteries using the separators produced in Examples 1 to 8 and Comparative Example 1. The results are shown in Table 3.

[Charge-Discharge Cycle Test]

The charge-discharge cycle test was performed using the nonaqueous electrolyte batteries produced above. The charging condition was constant-current constant-voltage charging at 1 C and 4.2 V, while the discharging condition was constant-current discharging at 1 C to 2.75 V cut-off, and cycle characteristics were thus tested. Here, capacity retention after 100 cycles was used as an index of cycle characteristics. The test was performed on the batteries using the separators produced in Examples 1 to 8 and Comparative Example 1. The results are shown in Table 3.

[Check for Adhesion to Electrodes]

The batteries after the charge-discharge cycle test were disassembled and checked for separator-electrode adhesion. The adhesion was checked in terms of adhesion strength and uniformity. The results are shown in Table 3. Incidentally, with respect to adhesion strength, the electrode surface on the positive-electrode side and the electrode surface on the negative-electrode side were each evaluated relative to peel strength in the case of using the separator of Example 1 as 100. The relative values are shown in Table 3.

With respect to uniformity, the positive-electrode side and the negative-electrode side were each evaluated based on the following evaluation criteria from the degree of attachment of the adhesive porous layer on the electrode surface after a peel test.

—Evaluation Criteria (Uniformity)—

A: Almost the entire adhesive porous layer remained attached to the electrode surface [uniformity is good].

B: Most of the adhesive porous layer remained attached to the electrode surface, but the layer was partially broken [uniformity is fair].

C: Most of the adhesive porous layer did not remain attached to the electrode surface, and the layer was significantly broken [uniformity is poor].

Incidentally, peel strength upon the separation of the electrode surface from the adhesive porous layer was determined as follows. That is, in accordance with JIS K 6854, the loads required to peel the separator from the electrode surfaces on the positive-electrode side and the negative-electrode side were each measured to determine the peel strength.

By this peel test, the loads required to separate the separator from the electrode surfaces on the positive-electrode side and the negative-electrode side were each measured to determine the peel strength.

[Shutdown Characteristics]

The shutdown characteristics of the separators produced in Examples 1 to 8 and Comparative Example 1 were evaluated by the following method. The results are shown in Table 3.

First, the separator was punched to a diameter of 19 mm, immersed in a 3 wt % methanol solution of a nonionic surfactant (manufactured by Kao Corporation; EMULGEN 210P), and air-dried. The separator was impregnated with an electrolyte and sandwiched between SUS plates (15.5 mm in diameter). As the electrolyte, a liquid prepared by dissolving 1 mol/L of $LiBF_4$ in a solvent obtained by mixing propylene carbonate and ethylene carbonate in a weight ratio of 1:1. They were enclosed in a 2032-type coin cell. Leads were taken from the coin cell, a thermocouple was attached thereto, and the cell was placed in an oven. The temperature was raised at a rate of 1.6° C./min, and, at the same time, an alternating current with an amplitude of 10 mV and a frequency of 1 kHz was applied to measure the resistance of the cell.

In the above measurement, the resistance that reached $10^3$ ohm·$cm^2$ or more at a range of higher than 130° C. to 140° C. or lower was rated as A, the resistance that reached $10^3$ ohm·$cm^2$ or more at a range of higher than 140° C. to 150° C. or lower was rated as B, and the resistance that reached $10^3$ ohm·$cm^2$ or more at higher than 150° C. or the resistance that did not reach $10^3$ ohm·$cm^2$ or more at any temperature range was rated as C.

TABLE 3

| | Separator Physical Properties | | | Results of Load Characteristic Test | Results of Charge-Discharge Cycle Test | Check for Adhesion to Electrodes | | | | Shutdown Characteristics |
|---|---|---|---|---|---|---|---|---|---|---|
| | | | | | | Positive Electrode | | Negative Electrode | | |
| | $\Delta G$ sec/100 cc | $\Delta \tau$ — | $SD_{GS}/AV_{GS}$ — | % | % | Adhesion Strength | Uniformity | Adhesion Strength | Uniformity | |
| Example 1 | 70 | 0.18 | 0.19 | 94 | 96 | 110 | A | 100 | A | A |
| Example 2 | 50 | 0.03 | 0.20 | 97 | 95 | 110 | A | 105 | A | A |
| Example 3 | 70 | 0.25 | 0.24 | 92 | 90 | 95 | B | 95 | B | B |
| Example 4 | 20 | 0.23 | 0.10 | 92 | 91 | 110 | A | 110 | A | A |
| Example 5 | 35 | 0.27 | 0.35 | 80 | 82 | 90 | C | 90 | C | B |
| Example 6 | 70 | 0.20 | 0.28 | 92 | 90 | 100 | B | 95 | B | A |

TABLE 3-continued

| | Separator Physical Properties | | | Results of Load Characteristic Test % | Results of Charge-Discharge Cycle Test % | Check for Adhesion to Electrodes | | | | Shutdown Characteristics |
|---|---|---|---|---|---|---|---|---|---|---|
| | | | | | | Positive Electrode | | Negative Electrode | | |
| | ΔG sec/100 cc | Δτ — | SD$_{GS}$/AV$_{GS}$ — | | | Adhesion Strength | Uniformity | Adhesion Strength | Uniformity | |
| Example 7 | 40 | 0.17 | 0.20 | 97 | 94 | 110 | A | 110 | A | A |
| Example 8 | 73 | 0.27 | 0.23 | 91 | 89 | 85 | B | 85 | B | B |
| Comparative Example 1 | | | | | | | | | | |

Table 3 shows that because ΔG and Δτ are controlled, battery characteristics (load characteristics and cycle characteristics), separator-electrode adhesion, and shutdown characteristics in the examples are all excellent.

Example 9

As a coating liquid, a mixture of a styrene-butadiene copolymer (styrene copolymerization ratio: 40 mass %):carboxyl methyl cellulose:water=3:2:95 [mass ratio] was used. Both sides of the polyethylene microporous membrane used in Example 1 were coated with the same amount of the coating liquid, and dried to give a separator including an adhesive porous layer made of a styrene-butadiene copolymer. The physical property values of this separator were as follows: Gurley number (G$_S$): 234 sec/100 cc, SD$_{GS}$/AV$_{GS}$: 0.29, tortuosity (τ$_S$): 2.25, Gurley difference (ΔG): 74 sec/100 cc, tortuosity difference (Δτ): 0.27.

Incidentally, Example 9 was also subjected to evaluation in the same manner as in Example 1. The obtained results were at the same level as in Example 1.

The invention claimed is:

1. A separator for a nonaqueous electrolyte battery comprising a composite membrane including:
   a porous substrate that contains a thermoplastic resin; and
   an adhesive porous layer that is provided on at least one side of the porous substrate and contains an adhesive resin,
   the difference between the Gurley number of the porous substrate and the Gurley number of the composite membrane being 20 sec/100 cc or more and 75 sec/100 cc or less,
   the difference between the tortuosity of the porous substrate and the tortuosity of the composite membrane being 0.30 or less,
   the ratio of the standard deviation of the Gurley number of the composite membrane to the mean of the Gurley number of the composite membrane is 0.3 or less.

2. The separator for a nonaqueous electrolyte battery according to claim 1, wherein the Gurley number of the porous substrate is 50 sec/100 cc or more and 800 sec/100 cc or less.

3. The separator for a nonaqueous electrolyte battery according to claim 1, wherein the tortuosity of the composite membrane is 1.5 to 2.5.

4. The separator for a nonaqueous electrolyte battery according to claim 1, wherein the adhesive porous layer has an average pore size of 1 nm or more and 100 nm or less.

5. The separator for a nonaqueous electrolyte battery according to claim 1, wherein the adhesive resin is a polyvinylidene fluoride resin.

6. The separator for a nonaqueous electrolyte battery according to claim 5, wherein the polyvinylidene fluoride resin has a weight average molecular weight of 500,000 or more and 3,000,000 or less.

7. A nonaqueous electrolyte battery comprising:
   a positive electrode;
   a negative electrode; and
   the separator for a nonaqueous electrolyte battery of claim 1 disposed between the positive electrode and the negative electrode,
   an electromotive force thereof being obtained by lithium doping/dedoping.

* * * * *